(12) United States Patent
Dupont (10) Patent No.: US 11,400,522 B2
(45) Date of Patent: Aug. 2, 2022

(54) SELF-LOCKING HOLLOW SHAFT CLAMPING MECHANISM

(71) Applicant: Levicron GMBH, Kaiserslautern (DE)

(72) Inventor: Ralf Dupont, Sankt Wendel (DE)

(73) Assignee: Levicron, GMBH, Kaiserslautern (DE)

( * ) Notice: Subject to any disclaimer, the term of this patent is extended or adjusted under 35 U.S.C. 154(b) by 0 days.

(21) Appl. No.: 16/616,772

(22) PCT Filed: May 24, 2018

(86) PCT No.: PCT/EP2018/063744
§ 371 (c)(1),
(2) Date: Nov. 25, 2019

(87) PCT Pub. No.: WO2018/215636
PCT Pub. Date: Nov. 29, 2018

(65) Prior Publication Data
US 2020/0086399 A1   Mar. 19, 2020

(30) Foreign Application Priority Data

May 26, 2017   (EP) ..................................... 17000895
May 28, 2017   (EP) ..................................... 17000896

(Continued)

(51) Int. Cl.
*B23B 31/26* (2006.01)

(52) U.S. Cl.
CPC .......... *B23B 31/265* (2013.01); *B23B 31/261* (2013.01); *Y10T 279/1008* (2015.01); *Y10T 409/309464* (2015.01)

(58) Field of Classification Search
CPC . B23B 31/265; B23B 31/261; B23B 31/4026; B23B 31/4033; B23B 31/406;

(Continued)

(56) References Cited

U.S. PATENT DOCUMENTS

| | | | | | |
|---|---|---|---|---|---|
| 4,708,040 | A | * | 11/1987 | Erickson ............... | B23B 29/046 403/322.2 |
| 5,035,557 | A | * | 7/1991 | Kohlbauer ............ | B23B 31/261 409/233 |

(Continued)

FOREIGN PATENT DOCUMENTS

DE   19618610 A1 *   11/1996   ........... B23B 31/261

OTHER PUBLICATIONS

Machine Translation, DE19618610 A1, Huber et al., Nov. 14, 1996. (Year: 1996).*

*Primary Examiner* — Chwen-Wei Su (57) ABSTRACT

This invention concerns a clamping device for firmly holding a part to be clamped at a clamping recess in which the clamping device is arranged. The clamping device comprises a collet with a first external protrusion for engagement with an internal recess in an inner peripheral area of the part that is to be clamped and with a second external protrusion for engagement with an internal recess in an inner peripheral area of the clamping recess. At least one of the first external protrusion or the second external protrusion comprises a first external taper or a second external taper for pulling the part to be clamped axially into the clamping recess by a radial outward movement of the collet or a section of the collet and an operation stud including an external tapered section for effecting the radial outward movement of the collet. The connection between the operation stud and the collet is self-locked and pre-loaded after a clamping movement of the operation stud in axial direction that locks and pre-loads the external taper of the operation stud and the collet or a part between the collet and the operation stud with each other. The invention includes a method for a part to be clamped in a clamping recess.

22 Claims, 6 Drawing Sheets

(30) Foreign Application Priority Data

May 29, 2017 (EP) .................................. 17000908
Sep. 22, 2017 (EP) .................................. 17192549

(58) Field of Classification Search
CPC . B23B 31/4066; B23B 2260/034; B23C 5/26; Y10T 279/1008; Y10T 279/1066; Y10T 409/309464
See application file for complete search history.

(56) References Cited

U.S. PATENT DOCUMENTS

| | | | |
|---|---|---|---|
| 8,297,893 B2* | 10/2012 | Hangleiter | B23B 31/265 409/233 |
| 8,376,670 B2* | 2/2013 | Shinano | B23B 31/265 409/233 |
| 2015/0290720 A1* | 10/2015 | Haimer | G01M 1/04 73/487 |

* cited by examiner

- PRIOR ART -

SELF-LOCKING HOLLOW SHAFT CLAMPING MECHANISM

This invention concerns a device to firmly attach a part that is to be clamped to a main part, wherein the part is to be clamped in a clamping recess of the main part that comprises at least a part of a clamping device. The clamping device comprises a collet with a first external protrusion for engagement with an internal recess in an inner peripheral area of the part that is to be clamped and with a second external protrusion for engagement with an internal recess of the main part. At least one of the first external protrusion and/or the second external protrusion comprises a first external taper and/or a second external taper, respectively, for pulling the part that is to be clamped into the clamping recess by a radial outward movement of the collet. The clamping device further comprises an operation stud including at least one external tapered section for effecting the radial outward movement of the collet. The invention further concerns a spindle with a clamping device and a method of clamping a part which is to be clamped.

A part that is to be clamped is a part that is separable from the clamping device. It is to be clamped when the clamping device is operated. Then, the clamped part is attached to the main part. The part that is to be clamped can comprise several pieces which are interconnected with each other.

A clamping recess in which the clamping device is arranged can be arranged inside a shaft. The main part can be a shaft for spinning or positioning purposes or a non-rotatable part that carries the clamping device. A shaft can also be fixed for some purpose. A spindle, in this patent application, is a device with a bearing system that carries a shaft and this shaft at which a part to be clamped can be fastened which then can be positioned and moved along with the shaft. The clamping device holds the part that is to be clamped in order to fasten and position it, and, in case, to center and/or align it.

Figure 1A:
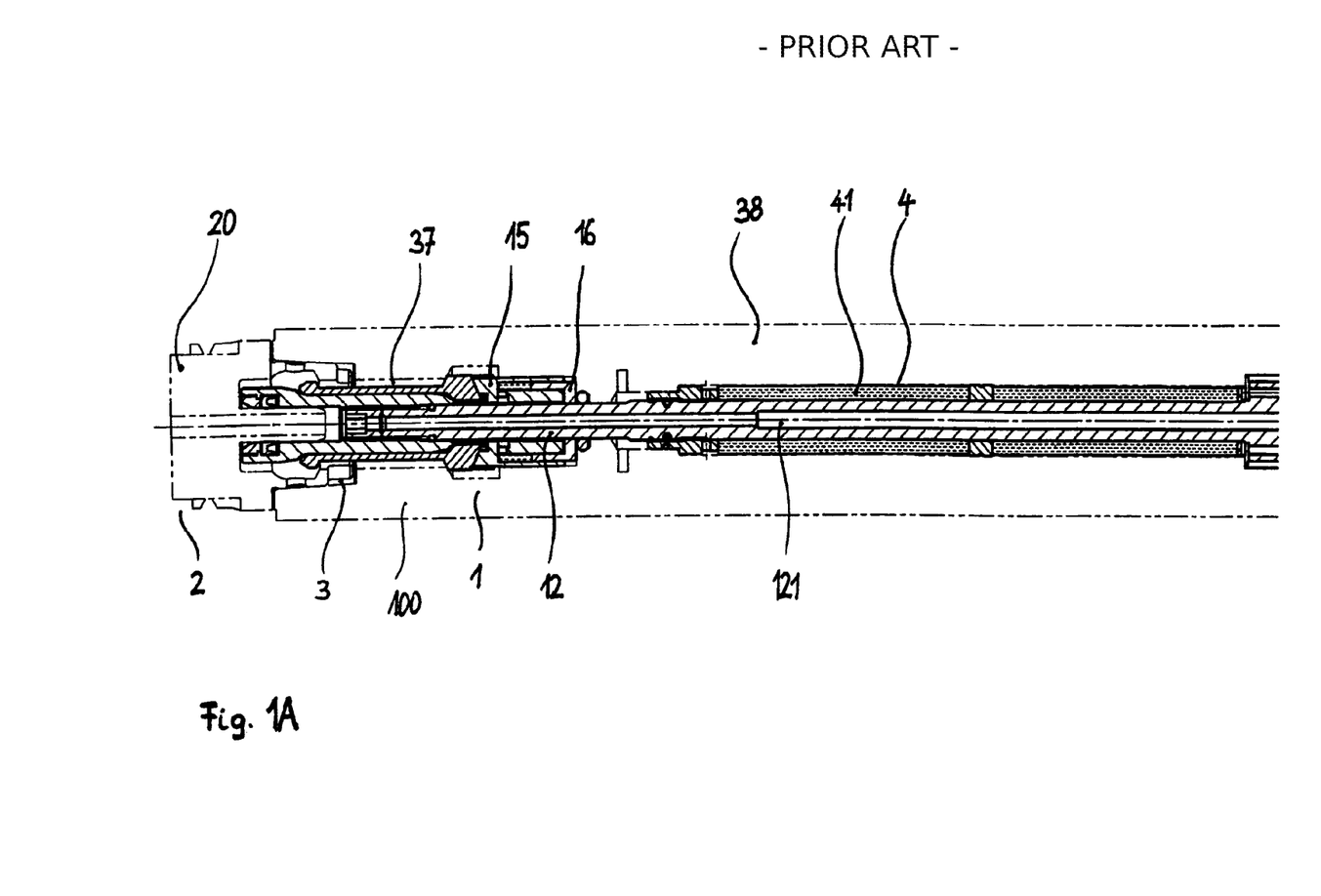
FIG. 1A shows a cross-section through a centreline plane of the spindle shaft of a first variant of a hollow shaft clamping mechanism according to the state of the art which comprises a clamping force generation unit that rotates along with the spindle shaft and which permanently exerts a tensile force to the clamping device that holds a part to be clamped, FIG. 1B gives a detailed view of the hollow shaft clamping mechanism shown in FIG. 1A in a magnified view.

FIG. 1A shows a state of the art first variation of a hollow shaft taper clamping mechanism 100 which is sold by the German company OTT-JAKOB Spanntechnik GmbH, Lengenwang, Germany. The part 2 to be clamped is a tool holder 20. A cross section of a shaft 38 with a clamping recess 3 and of a part 2 that is to be clamped into the shaft is shown and drawn in dash-double-dotted lines. The clamping recess comprises a part of an axial bore in the shaft 38. This first variation comprises a clamping force generation unit 4. It includes, for example, a single spring or multiple springs or a disc spring package 41, pre-loading an operation bar 12 that guides tensile force to a clamping device 1. A compressive counterforce is generated in the shaft 38 against the pre-load. These forces are applied to the clamping device 1 as long as the part 2 to be clamped is clamped. In order to release a clamped part, the operation bar is moved in a direction towards the clamping device what increases the pre-load generated by the force generation unit 4 at the same time. Thus, a high load is required to release a clamped part 2 that also affects the bearing system that carries the shaft.

The operation bar 12 has an axial bore 121 through which cleaning air and/or fluid can be guided through the clamping mechanism to the part 2 to be clamped.

Figure 1B:
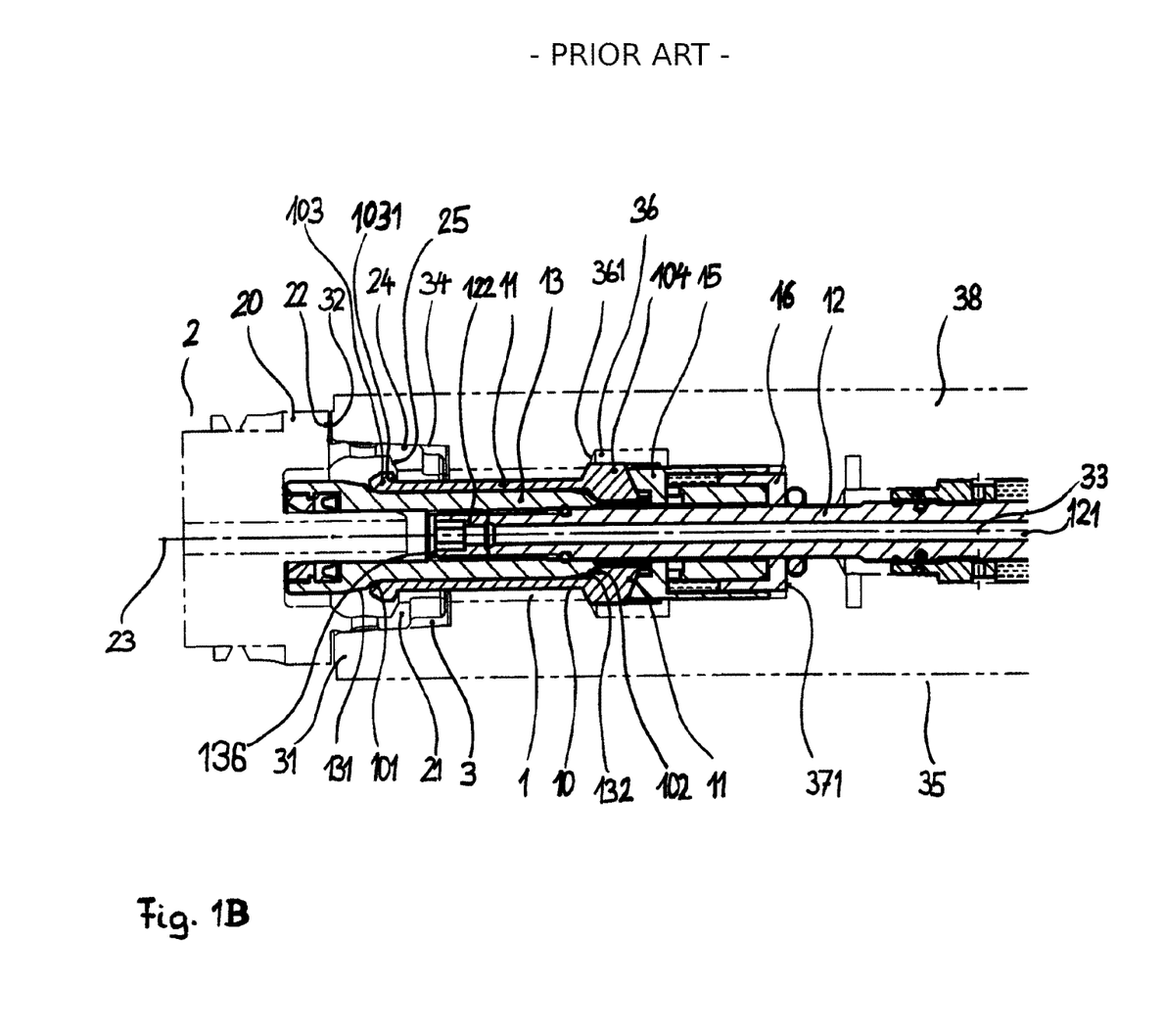

FIG. 1B shows the clamping device 1A of FIG. 1 in more detail. In clamping action, pre-load is applied from the force generation unit 4 to the clamping device 1 by the operation bar 12 which is connected to an operation stud 13. The operation stud 13 touches a collet 10 that comprises at least one collet segments 11 which is/are arranged over the outer perimeter of the operation stud 13. The operation stud 13 further comprises a first external tapered section 131 at an intermediate section of the operation stud 13 which is engaged with an internally tapered section 101 of the collet segments 11. The operation stud 13 further comprises a second external tapered section 132 at the end of the operation stud 13 which is engaged with a further internal tapered section 102 of the collet segments 11. Whenever the operation bar 12—and with it the operation stud 13—are axially moved to the right in FIG. 1B, the external tapered sections 131, 132 of the operation stud move the collet segments 11 radially outwards. In order that the collet segments 11 do not move in direction of the centre line 33 of the shaft 38, the collet segments 11 are supported by a bush 15 which transmits any axial thrust via a force transmission ring 16 into an axial face 371 inside the shaft 38.

The basic principle of a hollow shaft clamping mechanism 100, 200 is to grip, clamp and pre-load a part 2 to be clamped against an axial face 32 of the shaft 38 by the collet segments 11. The insertion section 21 has an external taper 24 which has an interference fit to the internal taper 34 of the shaft 38 when the insertion section 21 is fully inserted into the shaft 38 so that the axial face 22 of the part that is to be clamped touches the axial face 32 of the shaft. This means that the clamped part 2 and/or the shaft 38 need to be elastically deformed in order to the axial face 22 and 32 to touch. This leads to an excellent alignment of the part 2 that is to be clamped and the shaft 38 as well as an exceptional repeatability in radial as well as axial direction, even at larger form tolerances of the part 2 that is to be clamped. To achieve the axial clamping as described, the collet segments 11 have to slide outwards on the tapered face of the recess 36 of the shaft 38. The recess 25 preferably has a shape according to German standard DIN 69893. In order to eject the insertion section 21 from the shaft 38, the operation bar 12 can move to the left in FIG. 1B until the axial eject face 136 of the operation stud 13 that is connected to the end of the operation bar 12, pushes the insertion section 21 out of the press fit between the internal taper 34 and the outer taper 24 of the part 2. To eject the part 2 that is to be clamped, an external mechanism has to overcome the pre-load of the disc spring package 41 in axial direction of the shaft, the pre-load of the taper connection between the internal taper 34 of the shaft 38 and the external taper 24 of the part 2 to be clamped as well as any friction losses. This ejection load is then transmitted through the operation bar 12 into the operation stud 13.

The collet segments 11 can move radially outwards with an axial travel of the operation bar 12 in order to pull the external taper 24 of the insertion section 21 into the internal taper 34 of the shaft 38 and into their interference fit. For this, each collet segment 11 comprises an external protrusion 103 with an external taper 1031 that slides radially into a tapered recess 25 inside the insertion section 21 of the clamped part 2 and another tapered section 104 that slides radially outside on a tapered section 361 inside the shaft. An axial movement of the stud 13 thus generates a radial movement of the collet segments 11. Through the internal tapered section 25 inside the clamped part 2 and the internal taper 36 inside the shaft, an axial load is generated between the clamped part 2 and the shaft 38. This forces the interference taper fit between the tapers 34, 24 of the shaft 38 and the clamped part 2 to become tighter till the axial face 22 of the clamped part 2 touches the axial face 32 of the shaft 38.

The operation bar 12 as well as the clamping force generation unit 4 rotate together with the spindle shaft 38. The downside of this circumstance is that a long and thin rotating operation bar 12 is required which is prone to break and to cause high and inconsistent imbalances.

Figure 2:
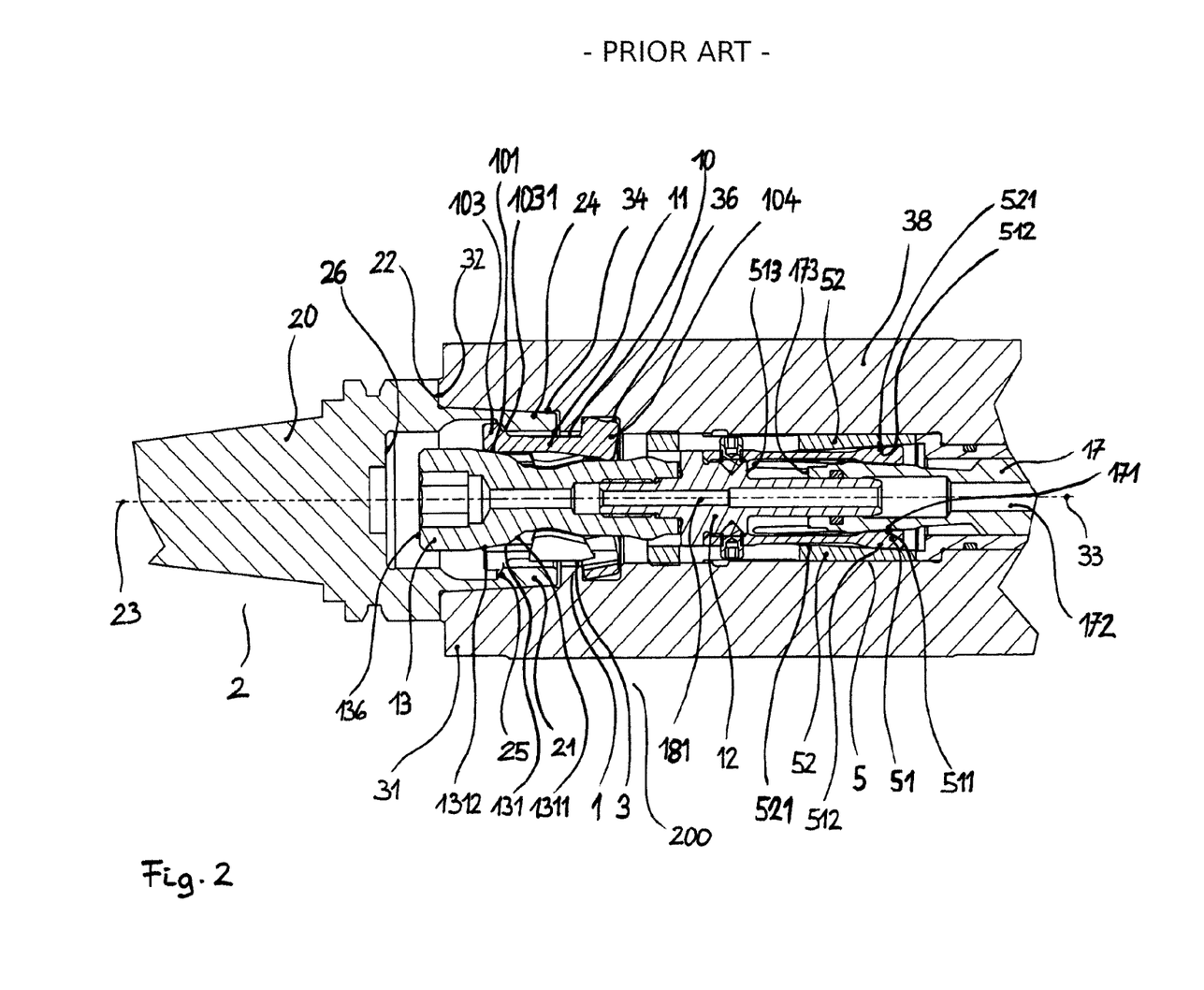
FIG. 2 shows a cross-section through a centreline plane of the spindle shaft of a second variant type of a hollow shaft clamping mechanism according to the state of the art which comprises a self-locking clamping force generation unit that rotates along with the spindle shaft and which permanently exerts a tensile force to the clamping device to keep a part clamped.

Another state of the art hollow shaft taper clamping system 200 is shown in FIG. 2. Some features of it are similar to those required to operate the clamping system 100 shown in FIGS. 1A and 1B and are marked with the same reference signs. Company Röhm GmbH, Sontheim, Germany, replaced the spring-based pre-load generation unit with the disc spring package 41 in FIG. 1A and the operation rod 12 in FIG. 1A by a locking unit 5 that is attached to a stud 13 that corresponds to the state of the art system described in view of FIG. 1B. As in FIG. 1B, an axial movement of the stud 13 to the right and into the shaft 38 causes a radial movement of a segmented collet 10 that pulls the part 2 to be clamped into a tapered interference fit between the tapers 34 and 24 till the axial face 22 of the part touches the axial face 32 of the shaft. Where the stud 13 and the segmented collet 10 are standard components that also work with spring-based pre-load mechanisms like described in FIG. 1A, the locking unit 5 allows to transfer a load onto the stud 13 as well as to lock this condition by clamping of a split double tapered tube 51 between two further tapers 521 and 171. The split double tapered tube 51 is attached to the stud 13 such that the stud cannot move any more in axial direction after clamping and stays pre-loaded in clamping direction. The split double tapered tube 51 comprises an internal tapered section 511 and an external tapered section 512. Inside this split double tapered tube 51 a locking-releasing bar 17 is located that comprise an outside tapered section 171 that again fits with the inside tapered section 511 of the split double tapered tube 51. The locking-releasing bar 17 can travel axially inside the split double tapered tube 51. A tapered bush 52 is mounted into the shaft 38 and surrounds an outside tapered section 512 of the split double tapered tube 51. Whenever the locking-releasing bar 17 is moved axially to the right in FIG. 2 and into the shaft 38, its outside tapered region 171 touches the inside tapered section 511 of the split double tapered tube 51 that is attached to the stud 13 through a short operation rod 12. A defined axial load on the locking-releasing bar 17 to the right in FIG. 2 moves the stud 13 axially and thus the collet segments 11 radially outwards which clamp the part 2.

After pulling the hollow insertion section 21 of the part to clamped 2 into the tapered interference fit between tapers 24 and 34, the locking-releasing bar 17 now widens the split double tapered tube 51 further. The split double tapered tube 51 now self-locks itself by its outside tapered section 512 and the inside tapered section 521 of the bush 52. The locking unit 5 now has pre-loaded and locked the clamping of the part 2. The locking unit 5 that is connected to the operation stud 13 thus replaces the spring based clamping force generation unit 4 described in regard of FIGS. 1A and 1B.

To eject the clamped part 2, the locking-releasing bar 17 has to move axially to the left in FIG. 2 till its axial end face 173 hits the internal axial face 513 of the split double tapered tube 51. For this, the axial load onto the locking-releasing 17 bar has to overcome the pre-load of the taper interference fit of the tapers of the split double tapered tube 51. After touching the internal axial face 513 of the split double tapered tube 51, the locking-releasing bar 17 now moves forwards and pushes the connected stud 13 axially till the axial end face 136 of the stud 13 hits the internal axial face 26 of the clamped part 2. The axial load on the locking-releasing bar 17 now has to overcome the axial pre-load of the tapered inference fit between taper 24 of the part 2 and the taper 34 of the shaft 38 to eject the clamped part 2.

Differing from the hollow shaft clamping mechanism 100 shown in FIGS. 1A and 1B, the clamping force generation unit 4 of the hollow shaft clamping mechanism 200 that is shown in FIG. 2 is self-locking. It can be operated externally by the locking-releasing bar 17. When pulling the locking-releasing bar 17 away from the insertion section 21, the collet 10 then clamps the part 2 in such a way described for the mechanism 100 in FIGS. 1A and 1B. When the collet 10 presses the part 2 to be clamped towards the axial connection face 32 of the shaft 38 and the part 2 to be clamped has reached its final position, no further movement of the operation stud 13 is possible for the force applied through the locking-releasing bar 17. The distance along which the operation stud 13 can be moved depends on the geometry of the operation stud 13, the collet segments 11, the internal recess 36 of the shaft 38, the internal tapered section 25 of the part 2 to be clamped and the force applied through the locking-releasing bar 17. As the tapers of these parts incline with the movement of the parts involved during clamping, the movement of the operation stud 13 is limited by geometry and clamping force applied through the locking-releasing bar 17. This clamping force only is responsible for an axial movement due to elastic deformation of the parts involved that also creates the pre-load. When the locking-releasing bar 17 is therefore pulled to the right in FIG. 2 further than the actual geometries allow, a self-locked pre-load similar to the clamping force generation unit 4 in the state of the art clamping mechanism 100 is achieved. The locking-releasing bar 17 is then clamped to the spindle shaft 38. In this state, the operation bar 12 permanently transmits tensile forces from the locking unit 5 to the clamping device 1 in order to clamp the part 2.

Though this solution does not require a shaft internal spring pre-loading to clamp a part, it has severe downsides. The serial combination of four connections of shallow angled tapers 171, 511, 512, 521 requires very tight manufacturing tolerances of components 17, 51 and 52. The axial adjustment of the push-pull-bar 17 and its travel is exceptionally tolerance sensitive and requires various adjustment mechanisms. Also, when ejecting the part 2 the behaviour of the tapered connection between the locking-releasing bar 17, the split double tapered tube 51 and the inside tapered bush 52 is physically not determined. Where it is intended that the tapered connection between the locking-releasing bar 17 and the split double tapered tube 51 has to unlock first so that the locking-releasing bar 17 can move axially to the left, it can happen that the applied load causes the tapered connection between the split double tapered tube 51 and the inside tapered bush 52 to close down. This again causes the self-locking function to increase its locking function rather than to release it. This behaviour was discovered several times during testing, and the clamped part 2 could not be ejected any more. Also, the large number of parts required for the clamping device 1, containing the operation stud 13, the segmented collet 10 and the locking unit 5 as well as its axial inconclusive behaviour cause severe issues with respect to shaft balancing and dynamics under shaft rotation. The serial combination of four tapered connections between the components 17, 51 and 52 renders the combined clamping and locking unit very sensitive against tribological effects. Whenever the locking unit 5 runs dry or the plating of a part involved fails, the locking unit 5 locks even if the part 2 is supposed to be ejected. This has caused serious issues in the field where the life-span of this system is limited to under 500,000 clamping and ejecting cycles.

One serious disadvantage of the clamping mechanism 200 is the complex design involving many single components what again results in a very cost intensive manufacturing and a poor behaviour when I comes to balancing and dynamic consistency. Also, the serial combination of four shallow angled taper connections over a long axial distance causes serious issues with respect to internal forces and thus life cycle time, consistency over time and premature wear.

Objective of the invention is to overcome the disadvantages that come with the state of the art solutions 100, 200 with respect to number of parts involved, complexity, wear, reliability, imbalance and dynamic behaviour and to provide a simpler clamping mechanism that can be operated reliably and with improved accuracy.

This objective is solved by the features of the independent patent claims. The subclaims concern advantageous embodiments of the invention.

Subject-matter of the invention is a clamping device for holding a part that is to be clamped in a clamping recess in which the collet is self-lockable by reversibly fixing the external taper of the operation stud and the collet or a part between the collet and the operation stud to each other. The fixation holds the operation stud and the collet in their relative position. Although forces that might try to release this connection can be effective in direction of a releasing relative movement of the collet and the operation stud, the friction forces of the self-locking are higher in this direction such that the connection is not released. There are several ways to realise this at this special point in the construction of a clamping device.

With the solution of this invention, any pre-load generation unit, as it can be found in the state of the art mechanism 100, can be avoided. Also, a dedicated locking unit that permanently delivers the full axial clamping force via a bespoke permanently pre-loaded operation rod attached to the collet is not required. The direct contact between the operation stud and the collet through at least one taper connection of a specific shape avoids the necessity to transfer any pre-load along a considerable number of parts in axial direction of the shaft. In a clamped state, the clamping force is preferably only transmitted through the operation stud into the collet. The operation stud and the collet both are situated within the shaft that forms the inner periphery of the clamping recess. Similar to the state of the art solution 100 and 200, an axial movement of the operation stud can cause a radial movement of the collet segment(s) that can slide radially outwards on a tapered recess of the part to be clamped on one end. At the other end the collet segment(s) can slide radially outwards on another tapered recess in the shaft inner contour. The tapered recess in the shaft and a radial movement of the collet into this recess is optional. Preferably, the collet segment(s) have an axial support within the shaft so that the collet segment(s) can transmit an axial force between the shaft and the part that is to be clamped. The radial movement of the collet segment(s) into the tapered internal recesses can create an axial force between the part that is to be clamped and the shaft. The radial movement of the collet segment(s) can pull the part into a taper of the shaft till the axial face of the part to be clamped and the axial face of the shaft touch. During clamping action the collet segment(s) and the operation stud can elastically deform in direction of the acting load on them. These parts thus can store energy and pre-load the connection. The touching faces between the operation stud and the collet segment(s) are of such shape that they are self-locking. Together with the elastic energy that is stored during clamping, the system can be pre-loaded as well as self-locked after clamping. After clamping, the clamping force on the operation rod can be released.

No pre-load unit like in the state of art solution 100 or a downstream locking-unit, as it can be found in the state of the art clamping system 200 as shown in FIG. 2, is required. The operation stud is preferably turnable together with the collet.

An advantage of the clamping device according to the invention is that the operation of clamping can be achieved by pushing or pulling the operation stud directly. There are no intermediate parts required between the operation stud and a locking/releasing bar for moving the operation stud. This direct connection enables that the locking/releasing bar has the same accuracy of a locking point at which clamping is completed as the operation stud itself. It does not differ because of different tensioning of springs as in the OTT-JAKOB system or because of many movable parts between the locking-releasing bar and the operation stud as in the Röhm system according to the state of the art.

It is possible that the collet is self-lockable by the friction force between the external taper of the operation stud and the collet or a part between the collet and the operation stud as described below. It is also possible that the operation stud is fixed in releasing movement direction by a form fit between the operation stud and the collet. To this end, in the surface of the first and/or second external tapered section of the operation stud and/or in the corresponding surface of the collet, for example, steps or/and notches can be integrated. In this way, the function of a self-lockable taper can be generated. Between the steps or notches, tapered interstitial sections can be provided in order to widen the collet when sliding the stud into it. The tapered section still has an overall form of a taper in this case. The steps in between can incline in counter-direction to the inclination of the tapered interstitial subsections between the steps. Then, the radial forces from the collet prevent that the stud can move in releasing direction. Another possibility is to provide a thread on a tapered section of the operation stud and a counter thread in the counter surface of the collet. The collet can have segments at which inner side a part of a non-continuous thread can be arranged, respectively. The thread on the tapered section of the operation stud preferably has a constant pitch. By turning the operation stud to screw the operation stud into the collet, the collet can perform a clamping action. The self-locking or at least a part of it is realised by the thread connection in this case.

The shaft may be a part of a spindle in which it can rotate. It may be fixed in axial direction to the spindle by an axial bearing, but it can also axially float. The clamping device can alternatively be used in a device which can comprise a non-rotatable shaft. A non-rotatable shaft can, for example, clamp a tool, a measurement probe or a cutting tool, or a work piece for accurate positioning in a machine or a robot that, for instance, can move it by its axes. The clamping device can be arranged in a measurement device or a robot.

The term "external" in the context of this application shall mean "arranged on the outside", here on the outside of the collet or the operation stud. "Internal" on the other hand shall mean at any inner face of a recess in a part. "Externally operable" shall mean that the clamping device can be operated without any direct interaction through a fixed connection with the clamping device, but by some operation means such as a locking-releasing bar.

An operation stud, in this patent application, shall mean a separate part or a section of a part of the clamping device that has the function of an operation stud as described in the application. The operation stud is preferably one single piece part, however, it can also comprise two or more parts.

A collet can comprise two or more non-connected parts. Such parts may be connected with each other by another part which may for example have the form of a ring. However, the collet can also be one single piece within which segments are movable.

The collet can also have one or more inner parts that are arranged between the operation stud and the collet, that are movable radially outwards and that are separable from the first and/or the second external protrusion of the collet. This can represent the axial movement of the protrusions more independent from the forces of the axial movement of the stud and its external taper. The inner part(s) of the collet is (are) preferably not movable against the shaft in axial direction. In this way, the external tapered section of the operation stud can act on the inner part(s) of the collet in order to move them radially outwards when the operation stud is moved in axial direction.

In this patent application, a taper shall not only mean a geometrically exact taper, but also any other suitable form that has a dimension increasing at a touching position between the operation stud and the collet during clamping, especially an increasing diameter in a counter-direction of the clamping movement of the operation stud. A taper, particularly an external taper of an external protrusion of the collet, can also have a small taper area in comparison to its counter-surface, especially if a counter-surface for the external taper is also tapered. The same is also true in regard of an internal tapered section of the collet and an external tapered section of the operating stud. It is possible that a tapered part of an edge is configured to slide over a tapered counter-surface. A taper can also have steps or notches on its outer peripheral surface in order that a counter surface with a corresponding surface can self-lock on the taper. A taper does not necessarily have to have a constant taper angle. Also, for example, a suited part of a spherical shape, an ellipsoid, ovaloid or any other geometry with generally increasing diameter in one direction can be a taper according to this invention. Also, a taper and its counter-taper may have different axial lengths.

A radial movement of the collet to the outside can take place at one or at both external protrusions of the collet. If only one protrusion is moved radially outwards, preferably the protrusion that can engage with the part to be clamped is moved. During this movement, the part to be clamped can be clamped. The self-locking and pre-load of the clamped part can be released again by a movement of the collet in the opposite direction than it is made for a clamping. The other protrusion of the collet can remain in a recess inside of the shaft during the movement of the protrusion for clamping the part to be clamped.

Self-locking according to this patent application means that the clamping device can stay in a clamped state without applying a force from outside the clamping device to the operation stud, particularly according to the state of the art, especially according to Röhm.

Self-locking can take place by a friction force between the operation stud and the collet. Friction force in moving direction of the operation stud can be calculated as the normal force multiplied by the friction coefficient between the touching faces. The friction force is effective on at least one contact area between the operation stud and the collet. The contact area can be tapered as defined above. There is also the possibility of a form-fit by steps or notches or a thread, preferably in a taper, which also might be combined with frictional self-locking. Frictional self-locking can take place in moving direction of the operation stud that can be translative or, in the case of a threaded function, in a turning direction. Self-locking can take place in one or more areas of the operation stud that can generate pre-load by axial movement of the operation stud.

Preferably, the operation stud comprises at least one of a first external tapered section of the operation stud and a second external tapered section of the operation stud. At least one of
 a first clamping angle between the surface of at least a section of the first external tapered section of the operation stud and a direction of clamping movement of the operation stud and
 a second clamping angle between the surface of at least a section of the second external tapered section of the operation stud and the direction of clamping movement of the operation stud
is small enough for the operation stud to be self-lockable by friction of the faces in contact at its first and second external tapered section, respectively, and the collet or a part between the collet and the operation stud. As a fundamental in mechanical engineering, self-locking of a taper connection depends on the taper angle and the friction coefficient between the faces of the connection that touch. Or more commonly spoken, in the case of self-locking, the friction force which is calculated as the normal force between the touching faces times the friction coefficient, is always larger than the force that is acting against the friction force to solve the connection without any external force. Depending on the materials of the friction partners, the clamping angle which can be a taper angle, can vary.

In order to make the self-locking more secure, The follow formula is preferably valid for the half angle of at least a part of a first or a second external tapered section of the operation stud:

$$\alpha < \tfrac{1}{2} \arctan(\mu)$$

wherein $\mu$ is the friction coefficient and $\alpha$ is the half angle of an external taper of the operation stud which is measured against its centre line. It is preferred that the clamping angle is smaller than the arcus tangent of the friction coefficient of the materials touching for the purpose of self-locking by friction.

Alternatively or additionally, the first and/or the second clamping angle, respectively, is smaller than 6° in the case that the materials in contact are both steel. For this material combination, a static friction coefficient of 0.15 can be assumed as a definition in this patent application. This corresponds to an amount of self-locking that is not unlockable very easily. In case that another material combination is present, the first and the second clamping angle, respectively, can be smaller than an angle $\alpha$ that can be calculated by $$\alpha < 6° \cdot (\arctan \mu / \arctan 0.15)$$

wherein $\mu$ is the friction coefficient of any other material combination. This leads to similar self-locking security as the combination steel-steel with other material combinations. All friction coefficients concerning self-locking at the operation stud in this patent application shall be static friction coefficients.

Alternatively or additionally, the axial clamping force between a clamped part and the shaft is preferably less than 14 times larger than the force required to lose the self-locked connections between the operation stud and the collet. This relation of the axial force between a clamped part and the shaft and releasing forces corresponds to a clamping angle that generates a secure self-locking which cannot be released very easily.

The part between the collet and the operation stud can, for example, be a hollow taper with specific friction properties or a coating to achieve this friction coefficient. Also, this part can be exchanged more easily in case of wear.

All angles concerning a taper in this application are, in case that the direction of clamping movement coincides with, half-angles, which means that they are measured from the taper surface against the taper centre line which preferably corresponds to the direction of clamping movement of the operation stud. The centre line can be a rotational axis of a taper or in case that the taper does not have a circular cross section, an averaged centre line, which for example can cross the centre of area in one or more cross sections.

The operation stud may have two external tapered sections for interaction with the collet. Each of the external tapered sections can be self-locking. However, it may be sufficient that the operation stud only has one self-locking external tapered section.

Preferably, at least one external tapered section of the operation stud comprises a first and a second tapered subsection. Preferably, each subsection is engageable with the collet without engagement of the other subsection of the same section, wherein the first subsection has a first subsection actuation angle which is different from a second subsection actuation angle of the second subsection. By the different angles, different types of actuation can be carried out by one tapered section. For example, a quick positioning stroke for the collet can be carried out. A clamping stroke to clamp the part can be carried out additionally or alternatively.

Preferably, during a clamping movement of the operation stud, the first subsection can engageable with the collet before the second subsection is engageable.

Preferably, the first subsection actuation angle is a gripping angle for gripping of a part that is to be clamped. Gripping can take place quickly and without clamping. The second subsection actuation angle is preferably a clamping angle such that the radial movement of the collet segment(s) with regard to a movement of the operation stud during an engagement of the second subsection is smaller than a radial movement of the collet segment(s) with regard to the same movement of the operation stud during the engagement of the first subsection. In this way, the first subsection targets on increased velocity of the radial movement of the collet, whereas the second subsection targets on increased force on the collet in the same direction.

Preferably, in case that two subsections are present in at least one of the first and the second external tapered sections of the operation stud, at least one second subsection has a second subsection clamping angle of less than 6°. At least one first subsection can have an actuation angle of more than 6°. By such subsections different clamping speeds can be realised when sliding the operation stud along the collet. A high radial velocity of the collet can be realised to grip a part that is to be clamped and a slower radial velocity of the collet to pre-load the part to be clamped by increased forces.

Preferably, only one of the first external tapered section and the second external tapered section of the operation stud, particularly the one which is arranged closer to the clamping recess, comprises a first and a second subsection. The external tapered section that—in this case—is not divided in subsections and the second external tapered subsection preferably have a clamping angle of less than 6°.

Preferably, the clamping device comprises an internal clamping device channel for guiding any liquid or gas through the clamping device, especially through the operation stud, wherein the clamping device channel can rotate with the clamping device and the spindle, if applicable, and a rotary feedthrough to connect the rotatable clamping device channel of the clamping device with a supply channel in a locking-releasing bar, wherein the locking-releasing bar is preferably non-rotatable.

This is considered to be a separate invention and the applicants reserve their right to separately prosecute it.

This design allows that a medium can flow from a non-rotatable part of the spindle through a supply channel through the locking-releasing bar to a clamped part that can rotate or be positioned around a centre line. A medium can flow from the supply channel through the rotary feedthrough and then through the clamping device channel to the clamped part. Preferably, the locking-releasing bar, in a mounted state, is arranged inside a shaft. The medium can, for example, be a coolant and/or a lubricant, especially for a machining process, or any gas like air or an inert gas.

The shaft can be arranged inside a spindle which drives the shaft. The shaft can be carried by a bearing system which is arranged between the shaft and the spindle. The locking-releasing bar can be attached to the spindle such that it is not rotatable.

The clamping device channel preferably extends through the centre of the operation stud. Preferably, the operation stud is open at its end towards the part to be clamped. Through such an opening medium can flow to a clamped part.

Preferably, the rotary feedthrough is detachable in axial direction of the shaft. Preferably, the rotary feedthrough can be split into at least two parts which are rotatable to each other in an assembled state. A first part can be a rotary feedthrough counter-part of the operation stud. The second part can be a rotary feedthrough ring which can be a separate part or a section of another part. A location for removing the two parts from each other can be a gap of a fluid bearing, for instance a gas or liquid bearing which is arranged between the two parts.

The shaft comprising the clamping mechanism can preferably be pulled out of the spindle in which the locking-releasing bar is arranged, preferably after disengagement of the locking-releasing bar from the operation stud. Preferably, the rotary feedthrough is detached by this process. Preferably, no further action is necessary to remove the shaft from the spindle. All connecting parts between a shaft or parts which can be pulled out together with it and the remaining parts of the spindle can be bearings, preferably gas bearings. All bearing parts except an extractable shaft assembly which may comprise parts of one or more bearings can remain in the spindle or housing when the spindle is extracted.

A shaft assembly comprises the shaft, the collet and parts that are arranged at the shaft and/or are rotatable with it, particularly parts of one or more bearings.

Preferably, the rotary feedthrough is an gasstatic, gasdynamic, hydrostatic or hydrodynamic radial bearing. Such a bearing can carry, support and/or guide the locking-releasing bar acting at the clamping device. The inner ring of such a bearing can be attached at both of the locking-releasing bar and the clamping device or might be a section of it, whereas the outer ring can be attached to the respective other one of the locking-releasing bar and the clamping device. Preferably, the rotary feedthrough is arranged inside the locking-releasing bar. However, it is also possible to arrange the rotary feedthrough inside a section of the operation stud. The bearing can preferably act as a sealing to prevent the gas or fluid that is guided through the rotary feedthrough from flowing into a shaft through a bore in which the locking-releasing bar is arranged or into a clamping system that is assembled in this shaft. With the small gap of a fluid or gas bearing, especially a gas bearing, it is possible to seal pressurized medium, for example medium with pressure of at least 10 bar, preferably at least 50 bar. An aerostatic bearing can be a high pressure aerostatic bearing using a pressure of more than 10 bar. The fluid or gas to supply the bearing can be supplied via a dedicated bore in the locking-releasing bar. It is also possible to supply the bearing with fluid from the medium supply channel in the locking-releasing bar or by a dedicated external supply source to the locking-releasing bar.

The idea of an easily separable rotary feed through based on a fluid or a gas bearing is considered as a single invention and the applicants reserve the right to separately prosecute it.

Preferably, the operation stud has over the length of engagement with the collet a maximum diameter that is equal to or smaller than any inner diameter of the collet, in a position where it is displaced radially outwards at a maximum, located further away from the part to be clamped than the considered axial position at the operation stud. In this way and, preferably, if not limited by an end stop and/or if no tool is clamped, the operation stud can be removed in direction of its actuation to clamp a tool. The shaft thus can be removed from the spindle along with the collet in axial direction without removing the operation stud or detaching the operation stud from a clamping-releasing-bar inside the spindle. When the shaft is removed, the operation stud becomes accessible for service work or replacement. Preferably, the shaft assembly also has no axial connection to the spindle in direction of removing it out thereof.

Preferably, the clamping device comprises a guide ring with radially extending guide slots in its inner periphery. Each of the guide slots is configured to radially guide one single collet segment in radial, preferably also axial direction. Preferably, a change of the angular position of the collet against the shaft is preventable. Alternatively or additionally, tilting around an axis square to the centre axis can be preventable by the guide ring. The guide slots can extend axially over the complete axial length of the radially inner periphery of the guide ring. The guide ring can be shorter in axial direction as a collet segment is. Preferably, the outer perimeter of the guide ring has a thread at its outer periphery. With this thread the guide ring can be screwed into shaft, preferably into an insertion section of the shaft. When the guide ring is removed from the shaft, preferably, the collet can be extracted from the hollow spindle end, preferably together with the guide ring. The guide ring can comprise one or more axial protrusions that can act as centring shoulder for centring up the guide ring on a counter-surface inside a hollow section of the shaft.

The guide ring is considered as a separate invention, and the applicants reserve their right to prosecute it as a separate application.

In a further aspect of the invention, a spinning or positioning device, especially a spindle, is proposed that comprises a clamping device as described above.

A spinning device means that considerable rotational speed is achieved by the spinning device. A positioning device is a device for positioning a clamped part by turning and/or translational movement. The accuracy of the clamping that is achieved by the proposed clamping device is advantageous for positioning, especially with respect to repeatability. This, in turn, is advantageous regarding imbalance issues and rotor dynamics in a spinning device.

A spindle according to this patent application is a device with a bearing system that allows a shaft to be aligned in radial and/or in axial direction. A spindle can include a motor or not. A clamping device in a spindle can hold and clamp the clamped part in order to clamp and locate it at the spindle shaft in axial and radial direction.

Preferably, a shaft has an axial shaft through bore beginning at a clamping end of the shaft, wherein the clamping device is operable by a locking-releasing bar by action on the clamping device and without action of a dedicated clamping force generation unit or a dedicated locking unit, wherein, preferably, the locking-releasing bar is fixed to a spindle stator in regard of rotation. Preferably, there is no clamping force generation unit that rotates with the shaft. Particularly, an axial force to produce a main part of the clamping force is applied to the operation stud only in a clamping process. Preferably, no permanent axial force is applied to the operation stud in a clamped state of the collet to produce a main part of the clamping force.

The spindle through bore does not have necessarily to be generated by boring. The spindle preferably has the form of a hollow shaft.

Preferably, the spindle shaft is extractable from the spindle, wherein the operating stud is connected to the locking-releasing bar and remains in the spindle.

Preferably, the spindle shaft is extractable from the spindle, wherein the clamping device is extractable with the shaft and the locking-releasing bar remains in the spindle.

Preferably, the shaft comprises a pre-loaded readjustment spring to perform a fast gripping of the part without clamping it. For this, the readjustment spring is effective between the operation stud and the shaft in such a way that it pre-loads the operation stud in direction of clamping. The readjustment spring can be a helical spring. Preferably, it is arranged around the operation stud in this case. Further, by such a readjustment spring a radial movement of the collet under rotation and centrifugal load can be compensated for by readjusting the axial position of the operation stud. Clamping of the part that is to be clamped is maintained after stopping the rotation. The readjustment spring is preferably arranged between the operation stud and the spindle shaft or the collet. The readjustment spring is preferably compressible in the moving direction of the operation stud when releasing a part.

Preferably, the locking-releasing bar is supported by a bar bearing between the locking-releasing bar and the shaft, wherein, preferably, the bar bearing is a journal bearing, a hydrostatic bearing, a hydrodynamic bearing or a gas static bearing and/or a gas dynamic bearing. Preferably, the bar bearing is a radial bearing.

Preferably, a stud sealing is arranged between the operation stud and the shaft in order to seal a deeper part of the spindle through bore from the open end of the shaft that is dedicated for clamping the part to be clamped.

In another aspect of the invention, a method for clamping a part to be clamped at a shaft is proposed. According to the method, self-locking of a clamping device is achieved by moving an operation stud with an external tapered section in axial direction of the shaft which moving causes a collet to radially move outward to clamp a part that is to be clamped. When the clamping forces start to build up the operation stud is moved further in the same axial direction such that friction between the external tapered section of the operation stud and the collet or a part between the collet and the operation stud effects self-locking of the clamping device.

For this, the angle between an external tapered section and the direction of axial movement of the operation stud is preferably less than 6°.

For clamping a part that is to be clamped, the collet can be pre-loaded. Clamping can take place by an axial movement of the part that is to be clamped relative to the shaft. As the clamping recess is preferably tapered, the axial movement also leads to a radial clamping.

As an embodiment of the invention a mechanism is proposed to clamp a part firm, safe and repeatable, but also removable into a spindle shaft. The clamping mechanism can comprise a segmented collet with an external clamping taper for engagement with an internal tapered section of the part that is to be clamped and with a second external clamping taper for engagement with an internal tapered section of the shaft. The clamped part can be pre-loaded against the shaft by this mechanism which is a state of the art in hollow shaft taper mechanisms. The clamping device can further comprise a central operation stud for actuating the segmented collet by three external tapered sections. Then, a deeply tapered section located in the middle of the central stud allows a quick radial movement of the segmented collet if moved in axial direction. If axially moved towards the engagement of the shaft with the part that is to be clamped it allows to quickly reduce the overall diameter of the collet in order to remove the hollow part from the spindle shaft. If moved axially towards inside the shaft, means away from the part that is to be clamped, the steep tapered section allows a quick pre-gripping of the part, preferably by moving the segmented collet radially with an increased velocity compared to the radial movement of the collet caused by its connection with the first external taper section of the operation stud. The two shallow tapered sections left and right of the deep tapered section generate a high pre-load by a further axial travel of the central operation stud towards inside the shaft when they act on the collet. For this, the segmented collet moves radially and interacts on its outside with the tapered section in the part that is to be clamped and the tapered section in the shaft. Because of at least one shallow angle in combination with the friction coefficient between the operation stud and the collet, the mechanism can not only pre-load the part that is to be clamped against the shaft due to elastic deformation of the parts involved, it also is self-locking. This allows a safe clamping under shaft rotation at high speeds and at high side loads to the clamped part.

In the following, an embodiment of the invention is described with details which can be combined with all other embodiments as far as they are compatible in the eyes of this person skilled in the art. The self-locking clamping unit can comprise an operation stud and a segmented collet around it. Both parts are located inside a shaft bore. The clamping of a hollow shank part into the bore can be performed by an axial movement of the central operation stud. Two tapered sections of the stud can move the segmented collet radially to the outside. When moved radially an external tapered section of the segmented collet can slide into a tapered section of the hollow shank of the part that is to be clamped. Another external tapered section of the segmented collet can slide radially into an internal tapered section of the bore in which the clamping unit is mounted. A further radial expansion of the segmented collet by a further axial travel of the operation stud can now create an axial load between the hollow shank part that is to be clamped and the part that contains the bore. The elastic elongation of the segmented collet and the hollow shank part in axial direction can ensure a constant and safe axial pre-load of the hollow shank part. Taper angles of under 6°, for sections between the operation stud and the segmented collet can ensure a self-locking once the hollow tool is clamped. To release the clamping and to remove the hollow part from the bore, the operation stud can travel axially in the opposite direction of clamping. After overcoming the axial friction force caused by a locking pre-load, the operation stud can move freely into axial directions.

In this embodiment an axial face at the operation stud can be used to push the hollow shank part out of the bore on an internal axial face of the hollow shank part. To remove the hollow shank part from the bore the operation stud can contain a tapered section that allows the segments of the segmented collet to move radially to the inside to reduce the overall diameter of the clamping unit. For this, the operation stud can comprise another tapered section that forces the segments of the segmented collet to move radially into the steeply tapered section of the operation stud. The clamping mechanism can contain a feedthrough that allows gas or fluid to be guided to the clamped part. The operation stud can be operated inside the bore by an external locking-releasing bar that has not to be connected with the bore or the part the bore is located in.

Several major benefits arise from the invention presented compared to the state of the art. In comparison to the state of the art described in view of FIGS. 1A and 1B the number of parts required is drastically reduced. No pre-load generating unit inside the shaft is required. Also, the overall length of the clamping mechanism is drastically reduced. Consequently, not only dynamics and dynamic balancing at rotation improve significantly and are much more consistent, also part manufacturing and assembly becomes way more economical. Preferably and as a benefit, releasing the clamping does not require an external compressing load to overcome the pre-load of springs that are mounted in the bore of the state of the art clamping system described in view of FIGS. 1A and 1B. This reduces the axial load to release the clamping significantly and allows smaller dimensioned parts to generate this release force. Furthermore, the invention allows the part with the bore, which is often a shaft that carries the part that is to be clamped, to be removed axially. In this case the segmented collet remains in the shaft and the operation stud can slide axially inside the segmented collet and can remain attached to a locking-releasing bar. This is helpful for maintenance work and not possible with the state of the art clamping systems depicted in either FIGS. 1A and 1B or FIG. 2.

In comparison to the state of the art described in view of FIG. 2, no separate locking unit is required which reduces the number of parts significantly. The reduction in shallow tapered sections improves the axial adjustment and travel tolerance of the operation stud in axial direction and improves the reliability over time significantly. The reduction in number of parts and size improves the dynamic behaviour and dynamic balancing again. The physical behaviour is not over-constrained like it is the case for the state of the art clamping system shown in FIG. 2. An increased self-locking when releasing the pre-load can be excluded. The central stud can be operated by a locking-releasing bar inside the bore without any connection to the bore or the part the bore is located in. If used in a rotating shaft, this improves the dynamic behaviour and dynamic balancing significantly as only the shaft, the operation stud and the segmented collet rotate.

However, since for a state of the art clamping system described in FIGS. 1A and 1B only an external force is required to release the clamping, for the invention a force in both axial directions is required to clamp as well as to release the clamping.

The Figures show embodiments according to the state of the art and, as an example only, an embodiment according to the invention.

Figure 3A:
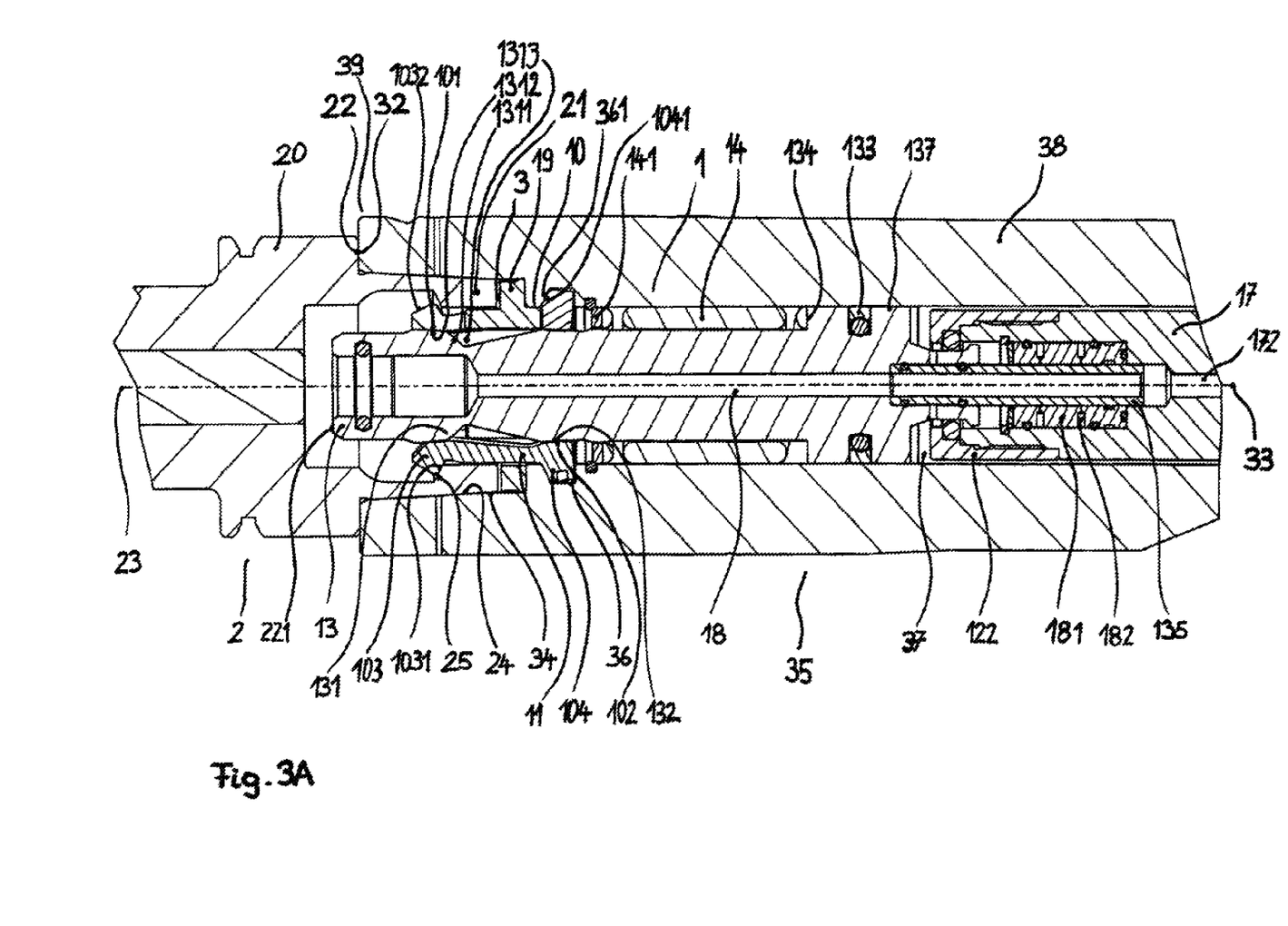
FIG. 3A shows a cross section plane through a centreline of a clamping device according to the invention.

FIG. 3A schematically shows a clamping device 1 according to the invention. Some features are similar to the features of the clamping systems 100 and 200 of FIGS. 1A, 1B and 2, respectively, and are generally marked with the same reference signs.

In FIG. 3A, a part 2 that is to be clamped is shown which has the form of a tool holder 20. It is clear that any other tool or part with the same interface geometry can be clamped by a hollow shank clamping mechanism according to the invention.

The part 2 that is to be clamped is partially shown with its insertion section 21 in a clamping recess 3 at an axial end of a shaft 38. The insertion section 21 protrudes in direction of a shaft 38. The shaft 38 is not shown completely in FIG. 3A, but, in reality, continues further to the right side in FIG. 3.

The outer contour of the insertion section 21 has the shape of a taper 24. The taper 24 is shown as fully engaged into a taper 34 at an inner contour of the clamping recess 3 and contains an interference fit between these tapers. An axial end face 22 of the part to be clamped is shown pressed against an axial end face 32 of the shaft 38.

Inside the clamping recess 3 a collet 10 is arranged. The collet 10 comprises at least one, preferably at least two single collet segments 11. The collet segments 11 are guided in a guide ring 19. The guide ring 19 can be screwed into the clamping recess 3 in the shaft 38. In this way, the collet segments 11 are guided relative to the shaft 38.

Each of the collet segments 11 comprises a first external protrusion 103 and a second external protrusion 104. A first external protrusion 103 is shown clipped into a tapered internal section 25 at the inner contour of the insertion section 21 of the part 2 to be clamped. A first external clamping taper 1031 of the collet 10 touches the tapered internal section 25 for transmitting clamping forces. The second external protrusion 104 is clipped into an internal recess 36 in an inner peripheral area of the shaft 38. The internal recess 36 has an internal tapered section 361. The internal tapered section 361 touches a second external clamping taper 1041 of the collet 10 for transmitting clamping forces.

Inside the collet 10, an operation stud 13 is arranged. By an axial operation movement of the operation stud 13, the collet 10 can be moved radially to the outside or to the inside. At its inside, the collet 10 has a first internal tapered section 101 which is arranged at the end of the inner periphery of the collet 10 in direction to the clamped part 2. Further, at its inside, the collet 10 has a second internal tapered section 102 which is arranged further in direction of a locking-releasing bar 17. Both of the internal tapered sections 101, 102 preferably have a half angle of less than 6° that is measured against the centre line 33. The operation stud comprises a first and a second tapered section 131 and 132. The first tapered section 131 is subdivided into a first and a second tapered subsection 1311 and 1312. During a clamping movement of the operation stud 13, the internal tapered sections 101, 102 are in contact with a second external tapered subsection 1312 of the first external tapered section 131 and a second external tapered section 132, respectively. The second tapered subsection 1312 and the second external tapered section 132 have a half angle of less than 6° measured against the centre line 33. When the operation stud 13 is moved to the right in FIG. 3, self-locking takes place because of the shallow taper angles of the tapered sections 1312, 132 and 101, 102. During the clamping travel in which the operation stud 13 is moved to the right in FIG. 3 the collet segments 11 are moved outwards. This causes the part 2 that is to be clamped to get pulled axially along the centre line into the clamping recess 3 by the internal tapered sections 25 and the first external clamping taper 1031 at the end of the collet segments 11 near the part 2 that is to be clamped, and by the internal tapered section 361 of the clamping recess and the second external clamping taper 1041 at the other end of the collet segments 11. The geometry of the collet 10, the internal recess in the clamped part 2 that is to be clamped with the tapered section 25 and the recess 36 in the shaft 38 cause a tensile force on the collet segments 11 and pull the axial end faces 22 and 32 of the clamped part 2 and the shaft 38 against each other. In this state, the collet segments 11 get stretched elastically. Due to the self-locking effect, this elastic deformation preloads the taper connection 24, 34 between the part 2 that is to be clamped and internal taper 34 in the shaft 38.

The operation stud 13 comprises a first tapered subsection 1311 which has a significantly steeper half angle than the second tapered section 1312. The external taper section 1311 can interact with the ends of the collet segments 11 close to the part 2 that is to be clamped. Because of the steeper taper angle of the first tapered subsection 1311, a fast gripping movement of the first protrusions 103 of the collet 10 takes place when the operation stud 13 is moved to the right in FIGS. 3A and 3B and when the first tapered subsection 1311 is engaged. During a releasing stroke of the operation stud 13 towards the clamped part 2, the end of the collet 10 that is closer to the part 2 that is to be clamped slides radially into a recess of the operation stud 13 which is partially bordered by the first external tapered subsection 1311. The end of the collet 10 towards the part 2 to be clamped is then radially retracted towards the centre line 33 and out of the internal tapered section 25 of the clamped part 2.

The operation stud 13 is arranged inside a shaft through bore 37. At its end opposite to the clamped part 2, the operation stud 13 is connected to a locking-releasing bar 17 via a rotary feedthrough 181. The operation stud 13 comprises a rotary feedthrough counter-part 135 which has the form of a tube. The feedthrough counter-part 135 is arranged into an axial bore of the operation stud 13. It allows a sealing function. Additionally, or alternatively, the feedthrough counter-part 135 allows a flexible behaviour in radial direction by sealing rings. The axial position of the tube is fixed. The outer periphery of the feedthrough counter-part 135 is designed as a journal gas bearing. The outer part of the air bearing is the rotary feedthrough 181. It comprises bearing gas supply bores 182 for supplying the bearing gas to the journal bearing.

The rotary feedthrough 181 enables a medium to flow through a supply channel 172 within the locking-releasing bar 17 into a clamping device channel 18. The clamping device 1 with clamping device channel 18 and locking-releasing bar 17 with the supply channel 172 can then change their relative angular position when a medium is flowing. The supply channel 172 extends through the complete axial length of the operation stud 13. The gas bearing as a combination of the feedthrough counter-part 135 and the rotary feedthrough 181 also has the function of a sealing against any fluid or gas in the channels 172 and 18.

The operation stud 13 further comprises a sealing 133 which interacts with an inner periphery of the shaft through bore 37. This sealing 133 seals the clamping recess 3 against the deeper parts of the shaft through bore 37.

Figure 3B:
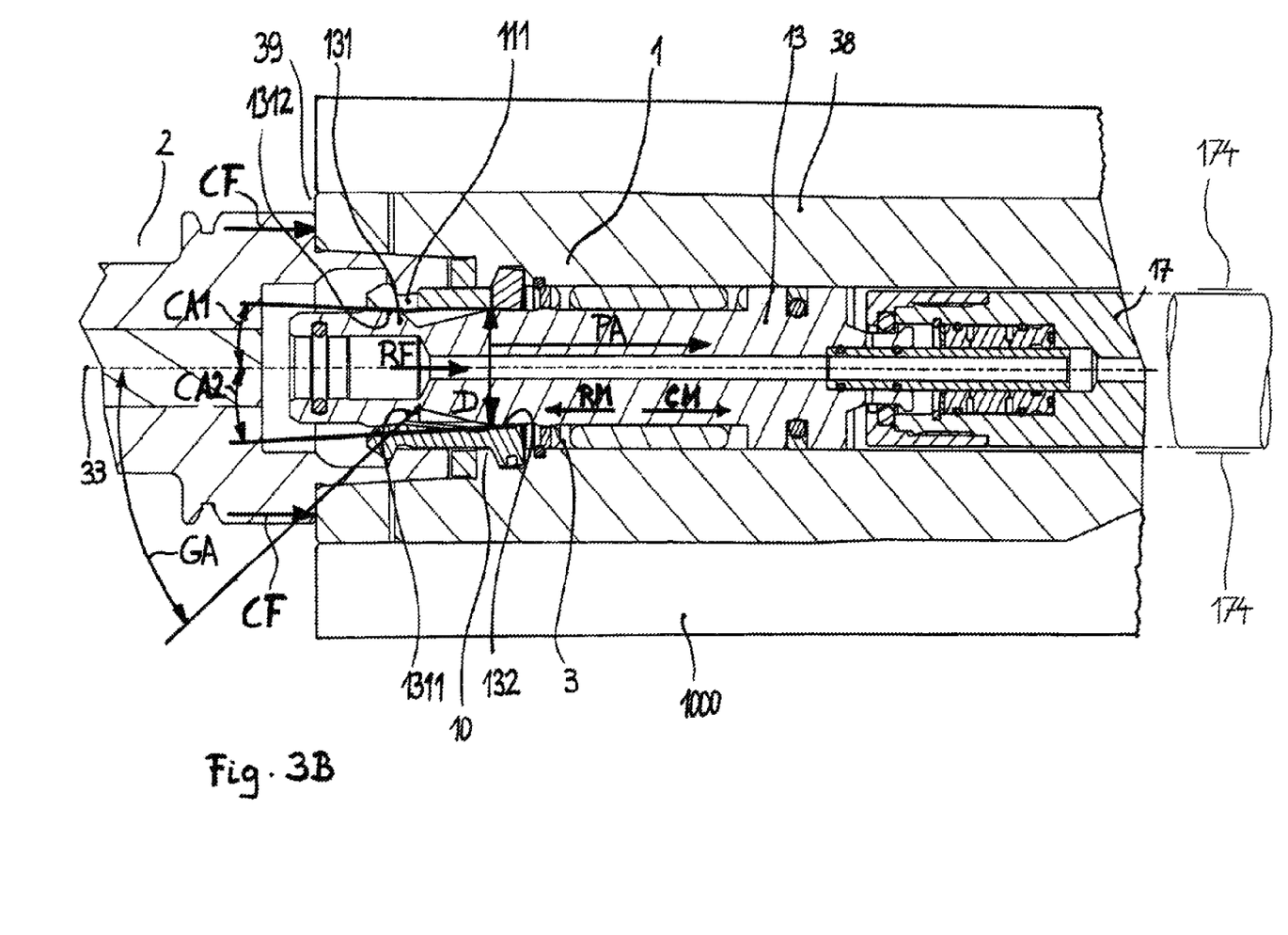
FIG. 3B shows the clamping device as in FIG. 3A, but along with different details and information.

In case that the part 2 is removed from the shaft 38, the shaft 38 can be retracted out of a spindle 1000 which is illustrated in FIG. 3B only. The operation stud 13 then remains attached to the locking-releasing bar 17 and inside the spindle 1000.

The operation stud 13 and the locking-releasing bar 17 are connected to each other such that the connection is disengaged when the locking-releasing bar 17 is not operated for locking or releasing the clamped part 2 by the clamping device 1.

The clamping device 1 further comprises a readjustment spring 14 which pre-loads the operation stud 13 with a force smaller than the force required to clamp the part 2 in direction of clamping. The readjustment spring 14 is arranged between a spring compression face 134 in the shaft through bore 37 of the shaft 38 and a snap ring 141 which is attached to the shaft 38. The readjustment spring 14 extends axially in the shaft 38.

In case that there is no part 2 clamped at the shaft 38, the collet segments 11 have a radial position maximum to the outside as the force of the readjustment spring 14 acts on the operation stud 13. To clamp a part 2, the operation rod 13 travels towards the external taper 24 which constitutes an interface between the part 2 and the internal shaft taper 34 where, in this case, the ends of the collet segments 11 towards the part 2 that is to be clamped slide into the recess at the first external tapered subsection 1311 of the operation stud 13. The ends of the collet segments 11 close to the part 2 that is to be clamped have a compression taper surface 1032 at their radially outer periphery. This compression taper surface 1032 can engage with an insertion section 21 of a part 2 to be clamped when the part is inserted into the clamping recess 3. Many, preferably all circumstances that cause the ends of the collet segments 11 towards the part 2 to be clamped not to slide into the recess 1311 of the operation stud 13 can be covered by this design. To allow insertion of the hollow shank of the part 2 that is to be clamped into the clamping recess 3, the insertion section 21 compresses the collet segments 11 at their end with the compression taper 1032 towards the part 2 to be clamped such that they slide into the inside of the hollow shank where they can clip into the internal tapered section 25.

When the shaft spins at higher speed, for example above 10,000 rpm, along with the mounted clamping device, centrifugal load can acts on the collet segments 11. In this case the axial force into the taper connections between the first external clamping taper 1031 of the collet 10 and the internal tapered section 25 of the part 2 as well as the second external clamping taper 1041 and the internal tapered section 361 of the clamping recess 3 increases. This again results in an increased axial clamping of the clamped part 2 to the shaft 38. On the other hand, however, the connections between the first internal tapered section 101 of the collet 10 and the second external tapered subsection 1312 of the operation stud 13 as well as the second internal tapered section 102 and the second external tapered section 132 of the operation stud lose on pre-load. In case the pre-load of the collet segments 11 due to their elastic deformation during clamping is not sufficient to maintain the clamping force adequately the readjustment spring 14 can come effective. It is strong enough to readjust the axial position of the operation stud 13 by pushing it further in direction away from the part 2 that is to be clamped. After stopping the spinning, a safe and pre-loaded clamping of the part 2 is maintained.

The operation stud 13 is guided inside the shaft through bore 37 at a guide surface 137 at the periphery of the operation stud 13. Slight eccentricities of the outer diameter of the operation stud 13 can cause a non-repeatable imbalance. Therefore, a very good alignment inside the shaft through bore 37 is preferred. A diametrical fit of, for example, 3-10 microns between the shaft through bore 37 and the guiding surface 137 is preferably designed.

FIG. 3B illustrates the clamping device 1 in a clamping recess 3 of a shaft 38. The shaft 38 is inserted into a simplified spindle 1000 for illustration purpose. FIG. 3B shows actuation and clamping angles at the operation stud 13. The first external tapered subsection 1311, which is to quickly retain the collet 10 into a recess 1313 of the operation stud 13 at the first external tapered subsection 131 and for gripping of the part 2 that is to be clamped, has a gripping angle GA relative to the central axis of the clamping recess 3. This gripping angle GA is preferably to be chosen from 20° to 45°, which is measured form the taper surface to the centre line 33. The second external tapered subsection 1312 of the first tapered section 131 of the operation stud 13 has a first clamping angle CA1 relative to the central axis of the clamping recess 3. The first clamping angle CA1 is less than 6° which is also measured form the taper surface to the centre line 33. The second external tapered section 132 of the operation stud 13 at the side of the locking-releasing bar 12 has a second clamping angle CA2 relative to the centre line 33 of the clamping recess 3. The second clamping angle CA2 is preferably less than 6° which is also measured form the taper surface to the centre line 33.

The operating stud 13 and the collet 10 touch at the first external tapered subsection 1311 of the first external taper 131 of the stud 13 which is in contact with the first internal tapered section 101 of the collet 10. The second tapered section 132 of the stud 13 is in contact with the second internal tapered section 102 of the collet 10.

Regarding the operation stud 13, a releasing movement direction RM and a clamping movement direction CM are indicated with corresponding arrows in FIG. 3B.

Further, as an example for the conditions which are required to remove the shaft 38 from the spindle 1000, a maximum diameter D of the operation stud 13 is indicated.

Along an exemplary travel PA which starts at the diameter D in axial direction of the shaft 38, the maximum diameter D is smaller than the inner diameter of the collet 10 and the shaft 38. Also, the guide surface 137 of the operation stud 13 has a smaller diameter than the parts of the shaft through bore 37 which are further away from the guide surface 137 with regard to the clamping end of the shaft 38. More generally spoken, the outer diameter of the parts inside the through bore 37, for example the operation stud 13, are, starting from the considered outer diameter in a direction away from the clamping stop 39 of the shaft 38, smaller than the inner diameter of the collet and the through bore 37. Preferably this is the case, if the collet segments 11 are fully engaged in the taper connection between the internal tapered section 361 of the clamping recess 3 of the shaft 38 and the second external clamping taper 1041 of the collet 10. Also, the outside of the shaft assembly 35, that might, additionally to the shaft and the collet, also contain other parts like bearings, does not have any larger diameters that prevent the shaft assembly 35 from being removed from of the spindle 1000. The shaft 38 or the shaft assembly 35 can be pulled out of the spindle 1000 without further action. The operation stud 13 remains attached to the locking-releasing bar 17 and inside the spindle 1000 in this case where. The collet 10 remains in the shaft 38.

Figure 3C:
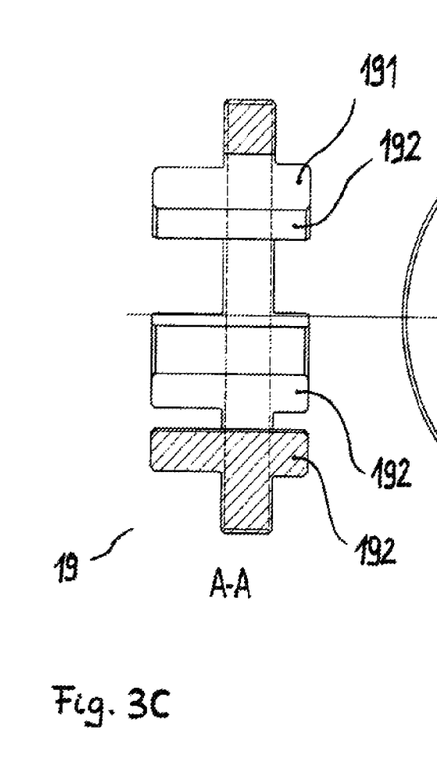
FIG. 3C shows a cross section through a centreline plane of a guide ring and FIG. 3D represents a view of a guide ring for guiding collet segments of the clamping device of FIG. 3C.
Figure 3D:
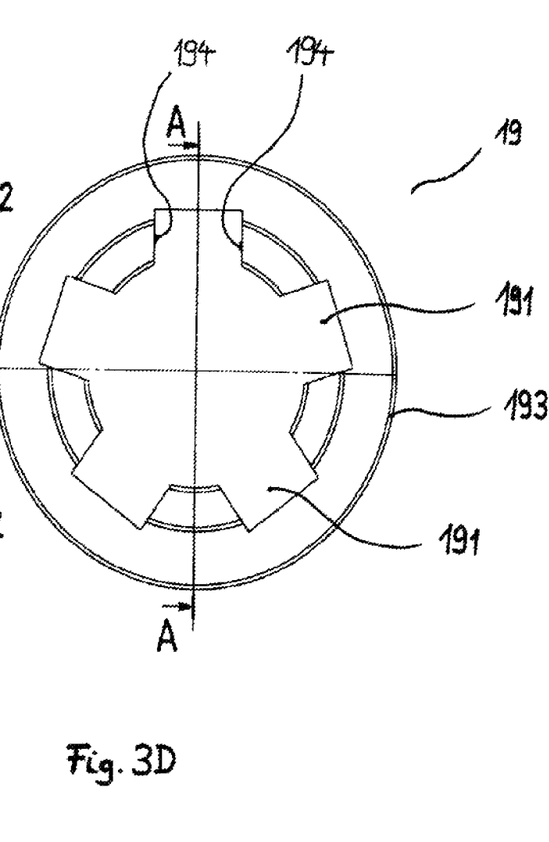

FIGS. 3C and 3D show a guide ring 19 with guide slots 191. The guide ring 19 shall make sure that any side face of a single collet segment 11 does not move in any other plane than in the plane defined by the touching plane 194 which touches a side face in circumferential direction of a corresponding collet segment 11. The number of guide slots 191 corresponds with the number of collet segments 11 of the collet 10. The guide ring 19 comprises a centering protrusion 192 in order to centre the guide ring 19 in the clamping recess 3. The guide ring 19 comprises a thread 193 at its outer perimeter. By this thread 193 the guide ring 19 can be screwed into the clamping recess 3 which comprises a counter thread at its inner periphery.

LIST OF REFERENCE NUMERALS

1 Clamping device
10 Collet
101 First internal tapered section of the collet
102 Second internal tapered section of the collet
103 First external protrusion of the collet for engaging the collet in the part that is to be clamped
1031 First external clamping taper of the collet
1032 Compression taper surface
104 Second external protrusion of the collet for engaging the collet in the shaft
1041 Second external clamping taper of the collet
11 Collet segment
111 Side faces of the collet segments in circumferential direction of the collet
12 Operation bar
121 Longitudinal bore in the operation bar
122 Operation bar head
13 Operation stud
1310 Contact zone
131 First external taper of the operation stud at the side of the part that is to be clamped
1311 First external tapered subsection of the first external taper of the operation stud
1312 Second external tapered subsection of the first external taper of the operation stud
1313 Recess in the operation stud
132 Second external taper of the operation stud at the side of the operation stud
133 Sealing ring
134 Spring compression face of the operation stud
135 Rotary feedthrough counter-part of the operation stud
136 Axial end face of the operation stud
137 Guide surface of the operation stud
14 Readjustment spring
141 Snap ring
15 Bush with tapered end
16 Support ring
17 Locking-releasing bar
171 Outside tapered section of the locking-releasing bar
172 Supply channel in the locking-releasing bar
173 Axial end face of the locking-releasing bar
174 Radial bar bearing
18 Clamping device channel
181 Rotary feedthrough
182 Bearing gas supply bore
19 Guide ring for guiding the collet segments in the touching plane
191 Guide slots
192 Centering protrusion
193 Thread at the outer periphery of the guide ring
194 Touching plane
2 Part that is to be clamped
20 Tool holder
21 Insertion section
22 Axial end face of the part to be clamped
23 Central axis of the part that is to be clamped
24 External taper
25 Internal tapered section
26 Internal axial end face
3 Clamping recess
31 Insertion section for the part to be clamped
32 Front axial connection face of the clamping recess
33 Centre line of the clamping recess
34 Internal taper in the shaft
35 Shaft assembly
36 Internal recess in an inner peripheral area of the clamping recess
361 Internal tapered section of the clamping recess
37 Shaft through bore
371 Axial face inside the shaft
38 Shaft
39 Axial Clamping stop
4 Clamping force generation unit
41 Disc-spring package
5 Locking unit
51 Split double tapered tube
511 Internal tapered section of the split double tapered tube
512 External tapered section of the split double tapered tube
513 Axial end face of the split double tapered tube
52 Inside tapered bush
100 First state of the art hollow shaft taper clamping mechanism (HSK type, German: Hohlschaftkegelspannmechanismus)
200 Second state of the art hollow shaft taper clamping mechanism (HSK type)
1000 Spindle
D Maximum diameter
PA Exemplary travel along a passing area for the maximum diameter of the operation stud in direction away from the clamping end of the shaft
CA1 First clamping angle of the second external tapered subsection of the first external taper of the operation stud CA2 Second clamping angle of a second external taper of the operation stud
GA Gripping angle of a first external tapered subsection of the external taper of the operation stud
CM Clamping movement direction of the operation stud
RM Releasing movement direction of the operation stud
CF Clamping force
RF Releasing Force

The invention claimed is:

1. Clamping device (1) for holding a part that is to be clamped (2) in a clamping recess (3) in which the clamping device (1) is arranged, the clamping device (1) comprising:
a collet (10) with a first external protrusion (103) for engagement with an internal recess (25) in an inner peripheral area of the part that is to be clamped (2) and with a second external protrusion (104) for engagement with an internal recess (36) in an inner peripheral area of the clamping recess (3), wherein at least one of the first external protrusion (103) and/or the second external protrusion (104) comprises a first external taper (1031) and/or a second external taper (1041), respectively, for pulling the part to be clamped (2) into the clamping recess (3) by a radial outward movement of the collet (10) or a section of the collet (10) and
an operation stud (13) including an external tapered section (131, 132) for effecting the radial outward movement of the collet (10),
wherein the collet (10) is self-lockable by a movement of the operation stud (13) in axial direction that fixes the external tapered section of the operation stud (13) and the collet (10) or a part between the collet (10) and the operation stud (13) to each other,
characterized in that the operation stud has two external tapered sections for interaction with the collet, wherein each of the external tapered sections is self-locking.

2. Clamping device (1) according to claim 1, wherein the two external tapered sections of the operation stud comprise
a first external tapered section (131) and
a second external tapered section (132),
characterised in that
a first clamping angle (CA1) between at least a section of the surface of the first external tapered section (131) of the operation stud (13) and a direction of clamping movement (CM) of the operation stud (13) and
a second clamping angle (CA2) between at least a section of the surface of the second external tapered section (132) of the operation stud (13) and the direction of clamping movement (CM) of the operation stud (13)
is small enough for the operation stud (13) to be self-locking by friction of the faces in contact at its first and second external tapered section (131, 132), respectively, and the collet (10) or a part between the collet (10) and the operation stud (13).

3. Clamping device (1) according to claim 2, characterised in that at least one of the first and the second clamping angles (CA1, CA2) is smaller than the half of the arctangent of a friction coefficient between the surface of the first and/or second external tapered section (131) of the operation stud (13), respectively, and the collet (10) or a part between the collet (10) and the operation stud (13).

4. Clamping device (1) according to claim 2, characterised in that the first and/or the second clamping angle (CA1, CA2), respectively, is smaller than 6° wherein the materials in contact are both steel.

5. Clamping device (1) according to claim 2, characterised in that another contacting material combination than a combination in which both materials in contact are steel is present, the first and/or the second clamping angle (CA1, CA2), respectively, is smaller than an angle that is calculated by multiplying 6° with the quotient of the arctangent of the friction coefficient of the other material combination divided by the arctangent of 0.15.

6. Clamping device (1) according to claim 2, characterised in that an axial force (AF) created by the clamping device between a part (2) that is to be clamped and a shaft (38) is less than 14 times larger than any axial force (RF) for releasing the clamping device.

7. Clamping device (1) according to claim 1, characterised in that the clamping recess (3) is arranged in a shaft (38) with a through bore (37) and that the clamping device (1) is operable by a locking-releasing bar (17) that is arranged in the through bore (37), wherein the clamping device (1) comprises
a clamping device channel (18) for guiding a liquid or gas through the clamping device (1), wherein the clamping device channel (18) is rotatable together with the clamping device (1) and the shaft (38) and
a rotary feedthrough (181) for a connection of the rotatable clamping device channel (18) of the clamping device (1) to a supply channel (172) in the locking-releasing bar (17).

8. Clamping device (1) according to claim 7, characterised in that a bearing and sealing function of the rotary feedthrough (181) is realised by at least one of an aerostatic, aerodynamic, hydrostatic or hydrodynamic bearing.

9. Clamping device (1) according to claim 7, wherein the rotary feedthrough (181) is detachable in axial direction of the shaft (38), wherein at least two parts of the rotary feedthrough (181) are turnable relative to each other together with the shaft (38) and the locking-releasing bar (17), respectively, and are detachable from each other by an axial movement relative to each other.

10. Clamping device (1) according to claim 1, characterised in that the operating stud (13), at each axial position, does not have a diameter (D) that is greater than a minimum inner diameter of the collet (10), when it is in a position in which its minimum inner diameter is maximised, in direction away from the part to be clamped (2), such that the operation stud (13) is removable from the inside of the collet (10) in axial direction and away from the part that is to be clamped (2).

11. Clamping device (1) according to claim 1, characterised in that the clamping device (1) comprises a guide ring (19) with radially extending guide slots (191) in its inner periphery, wherein each guide slot (191) is configured to guide a collet segment (11) in a touching plane (194) with at least one side face (111) of the collet segment(s) (11), wherein the side face(s) (111) are arranged at the collet segments (11) in circumferential direction of the collet (10).

12. Clamping device (1) according to claim 11, characterized in that the guide slots (191) extend axially over the complete axial length of the radially outer periphery of the guide ring (19).

13. Clamping device (1) according to claim 1, characterised in that an outer periphery of the operation stud (13) is guided at the inner periphery of a shaft through bore (37).

14. Clamping device (1) according to claim 13, characterized by a clearance fit between the outer periphery of the operation stud (13) and the inner periphery of the shaft through bore (37).

15. Clamping device (1) according to claim 14, characterized in that the clearance fit has a play of less than 20 microns.

16. Spinning or positioning device comprising a shaft (38), characterised in that the shaft comprises a clamping recess (3) comprising a clamping device (1) for holding a part that is to be clamped (2) in a clamping recess (3) in which the clamping device (1) is arranged, the clamping device (1) comprising:
- a collet (10) with a first external protrusion (103) for engagement with an internal recess (25) in an inner peripheral area of the part that is to be clamped (2) and with a second external protrusion (104) for engagement with an internal recess (36) in an inner peripheral area of the clamping recess (3), wherein at least one of the first external protrusion (103) and/or the second external protrusion (104) comprises a first external taper (1031) and/or a second external taper (1041), respectively, for pulling the part to be clamped (2) into the clamping recess (3) by a radial outward movement of the collet (10) or a section of the collet (10) and
- an operation stud (13) including an external tapered section (131, 132) for effecting the radial outward movement of the collet (10),
- wherein the collet (10) is self-lockable by a movement of the operation stud (13) in axial direction that fixes
- the external taper of the operation stud (13) and
- the collet (10) or a part between the collet (10) and the operation stud (13) to each other, characterized in that the operation stud has two external tapered sections for interaction with the collet, wherein each of the external tapered sections is self-locking.

17. Spinning or positioning device (1000) according to claim 16, wherein the shaft has an axial through bore (37) that extends to the clamping recess (3) of the shaft (38),
- characterised in that the clamping device (1) is operable by a locking-releasing bar (17) by action on the clamping device (1) and without action of a dedicated clamping force generation unit (4) to permanently apply a force through an operation bar (12) to the operation stud (13) in a clamped state.

18. Spinning or positioning device (1000) according to claim 16, characterised in that the shaft (38) or a shaft assembly (35) is extractable from the spinning or positioning device (1000), wherein the clamping device (1) is connected to a locking/opening bar (17) and remains in the spinning or positioning device (1000) when the shaft is extracted, wherein the collet (10) remains in the shaft (38).

19. Spinning or positioning device (1000) according to claim 16, characterized in that the shaft (38) comprises a readjustment spring (14) by which an increased clamping due to the centrifugal load on the collet (10) under rotation and a resulting decreased pre-load between the operation stud (13) and the collet (10) is compensable by an axial adjustment of the operation stud (13) caused by the re-adjustment spring (14) in order to hold or restore the pre-load between the collet (10) and the operation rod (13).

20. Spinning or positioning device (1000) according to claim 16, characterised in that a fast gripping of a part (2) that is already inserted into a clamping recess (3) of the shaft (38) and that is not yet clamped is performable by a movement of the operation stud (13) that is effected by tension release of the readjustment spring (14) and a movement of the operation stud (13) by the readjustment spring (14).

21. Spinning or positioning device (1000) according to claim 16, characterised in that a locking-releasing bar (17) is supported by a bar bearing (174) between the locking-releasing bar (17) and the shaft (38).

22. Spinning or positioning device (1000) according to claim 16, characterised in that a stud sealing (133) is arranged between the operation stud (13) and the shaft (38) in order to seal a part of a through bore of the shaft (38) from the end of the clamping recess (3) of the shaft (38) in direction to the part to be clamped.

* * * * *